(12) United States Patent
Pence et al.

(10) Patent No.: US 6,856,664 B2
(45) Date of Patent: Feb. 15, 2005

(54) REACTOR SERVICING PLATFORM

(75) Inventors: Vernon Walter Pence, San Jose, CA (US); Terry L. Chapman, Los Gatos, CA (US); John Edward Maslakowski, Westlake Village, CA (US); Henry Peter Offer, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/429,121

(22) Filed: May 2, 2003

(65) Prior Publication Data

US 2003/0227993 A1 Dec. 11, 2003

Related U.S. Application Data

(63) Continuation-in-part of application No. 09/683,823, filed on Feb. 20, 2002.

(51) Int. Cl.[7] .............................................. G21C 19/00
(52) U.S. Cl. ....................................... 376/260; 376/261
(58) Field of Search ................................ 376/260, 294, 376/263, 268, 249; 182/142

(56) References Cited

U.S. PATENT DOCUMENTS

| | | | |
|---|---|---|---|
| 3,393,026 A | | 7/1968 | Gregson |
| 3,817,348 A | * | 6/1974 | Jones .......................... 182/142 |
| 3,960,242 A | | 6/1976 | Saxonmeyer |
| 3,967,741 A | | 7/1976 | Hoffmeister |
| 3,994,365 A | | 11/1976 | Petermann et al. |
| 4,078,969 A | | 3/1978 | Garin |
| 4,080,254 A | | 3/1978 | Poindexter |
| 4,115,193 A | | 9/1978 | Sepelak |
| 4,120,378 A | * | 10/1978 | Mills et al. .................... 182/14 |
| 4,200,172 A | | 4/1980 | Meuschke et al. |
| 4,401,619 A | | 8/1983 | McEdwards |
| 4,427,623 A | * | 1/1984 | Howard et al. ............. 376/263 |
| 4,505,874 A | | 3/1985 | Warren et al. |
| 4,639,351 A | | 1/1987 | Forner et al. |
| 5,085,824 A | * | 2/1992 | Busch et al. ................. 376/268 |
| 5,183,625 A | | 2/1993 | Batistoni |
| 5,241,572 A | * | 8/1993 | Matthews .................... 376/272 |
| 5,254,835 A | | 10/1993 | Dalke et al. |
| 5,291,531 A | | 3/1994 | Baversten et al. |
| 5,369,676 A | * | 11/1994 | Ortega et al. ................ 376/271 |
| 5,526,384 A | * | 6/1996 | Joly ............................. 376/271 |
| 5,600,686 A | | 2/1997 | Stoss |
| 5,687,207 A | | 11/1997 | Meuschke |
| 5,774,513 A | | 6/1998 | Urko |

* cited by examiner

*Primary Examiner*—Michael J. Carone
*Assistant Examiner*—R Palabrica
(74) *Attorney, Agent, or Firm*—Armstrong Teasdale LLP

(57) ABSTRACT

A modular reactor servicing platform for a nuclear reactor is provided. The modular servicing platform includes a plurality of modular sections coupled together, a support structure coupled to the coupled together modular sections, a center access opening, and a refuel access channel extending from the center access opening to an outer edge of the platform forming a substantially C-shaped servicing platform. Each modular section includes a plurality of interconnecting beams, and at least one floor panel attached to and covering the beams.

23 Claims, 7 Drawing Sheets

REACTOR SERVICING PLATFORM

CROSS REFERENCE TO RELATED APPLICATIONS

This application is a continuation-in-part of U.S. patent application Ser. No. 09/683,823 filed Feb. 20, 2002, which is hereby incorporated by reference in its entirety.

BACKGROUND OF THE INVENTION

This invention relates generally to nuclear reactor, and more particularly to a service platform for use in a nuclear reactor.

A reactor pressure vessel (RPV) of a boiling water reactor (BWR) typically has a generally cylindrical shape and is closed at both ends, e.g., by a bottom head and a removable top head. A top guide, sometimes referred to as a grid is spaced above a core plate within the RPV. A core shroud, or shroud, surrounds the core plate and is supported by a shroud support structure. The core shroud is a reactor coolant flow partition and structural support for the core components. Particularly, the shroud has a cylindrical shape and surrounds both the core plate and the top guide. A removable head is coupled to a head flange at the top of the shroud.

During refueling of a nuclear reactor, the majority of the servicing operations are performed from a bridge system that spans the refueling floor and the reactor and fuel storage pool cavities. These bridges typically have a straight four to eight foot wide walkway along their length and can be positioned above the reactor or refueling pool cavity. The refuel bridge must be elevated about five feet above the floor surface to clear the hand rails and other structures at the edge of the reactor cavity or service pools.

When in use, the bridge is moved to the desired position above the reactor permitting personnel to work along the walkway of the bridge. When working over a round reactor vessel, access to a specific azimuth zone of the round reactor vessel is limited by the shape of the bridge. With existing bridge access, the number of work activities, and number of personnel that can perform work at the same time is limited.

The type of work required to service a nuclear plant would be enhanced by simultaneous access to the reactor along the radial and tangential directions of the vessel or component. A normal bridge system positioned over a reactor can only accomplish radial or tangential alignment at two locations. Furthermore, both radial and tangential alignment can never be accomplished simultaneously. Therefore, personnel and equipment may not have the optimal angle of access for visual observation or equipment and component manipulation.

BRIEF DESCRIPTION OF THE INVENTION

In one aspect, a modular reactor servicing platform for a nuclear reactor is provided. The nuclear reactor includes a reactor pressure vessel positioned in a primary containment which includes a refueling floor having a reactor access opening. The modular servicing platform includes a plurality of modular sections coupled together, a support structure coupled to the modular sections, a center access opening, and a refuel access channel extending from the center access opening to an outer edge of the platform forming a substantially C-shaped servicing platform. Each modular section includes a plurality of interconnecting beams, and at least one floor panel attached to and covering the beams.

In another aspect, a reactor servicing platform for a nuclear reactor is provided. The servicing platform includes a frame including a plurality of interconnecting beams, a floor including at least one floor panel attached to and covering the beams, a support structure coupled to the frame, a center access opening in the floor, and a refuel access channel extending from the center access opening to an outer edge of the platform forming a substantially C-shaped servicing platform.

In another aspect, a method of servicing a nuclear reactor during a reactor outage is provided. The reactor includes a primary containment and a reactor pressure vessel positioned in the primary containment. The method includes positioning a reactor servicing platform above the reactor pressure vessel, and performing predetermined servicing operations on the reactor. The reactor servicing platform includes a frame including a plurality of interconnecting beams, a floor including at least one floor panel attached to and covering the beams, a support structure coupled to the frame, a center access opening in the floor, and a refuel access channel extending from the center access opening to an outer edge of the platform forming a substantially C-shaped servicing platform.

DETAILED DESCRIPTION OF THE INVENTION

A reactor servicing platform having a reactor access opening to permit access to the reactor internal components during refueling and maintenance outage operations is described below in detail. The reactor servicing platform has a substantially "C" shape that permits multiple work crews and equipment to simultaneously perform tasks at multiple azimuth locations around a reactor vessel and also permits refueling operations, for example, the removal and installation of fuel assemblies. The reactor servicing platform is fabricated from any suitable material(s), for example, aluminum, steel, and thermoplastic and fiber composite materials. Further, the reactor servicing platform has a modular design with major components sized for transport to a reactor refuel floor through an equipment hatch. The reactor servicing platform is assembled on site in the reactor containment building and can be disassembled and transported to another reactor.

Figure 1:
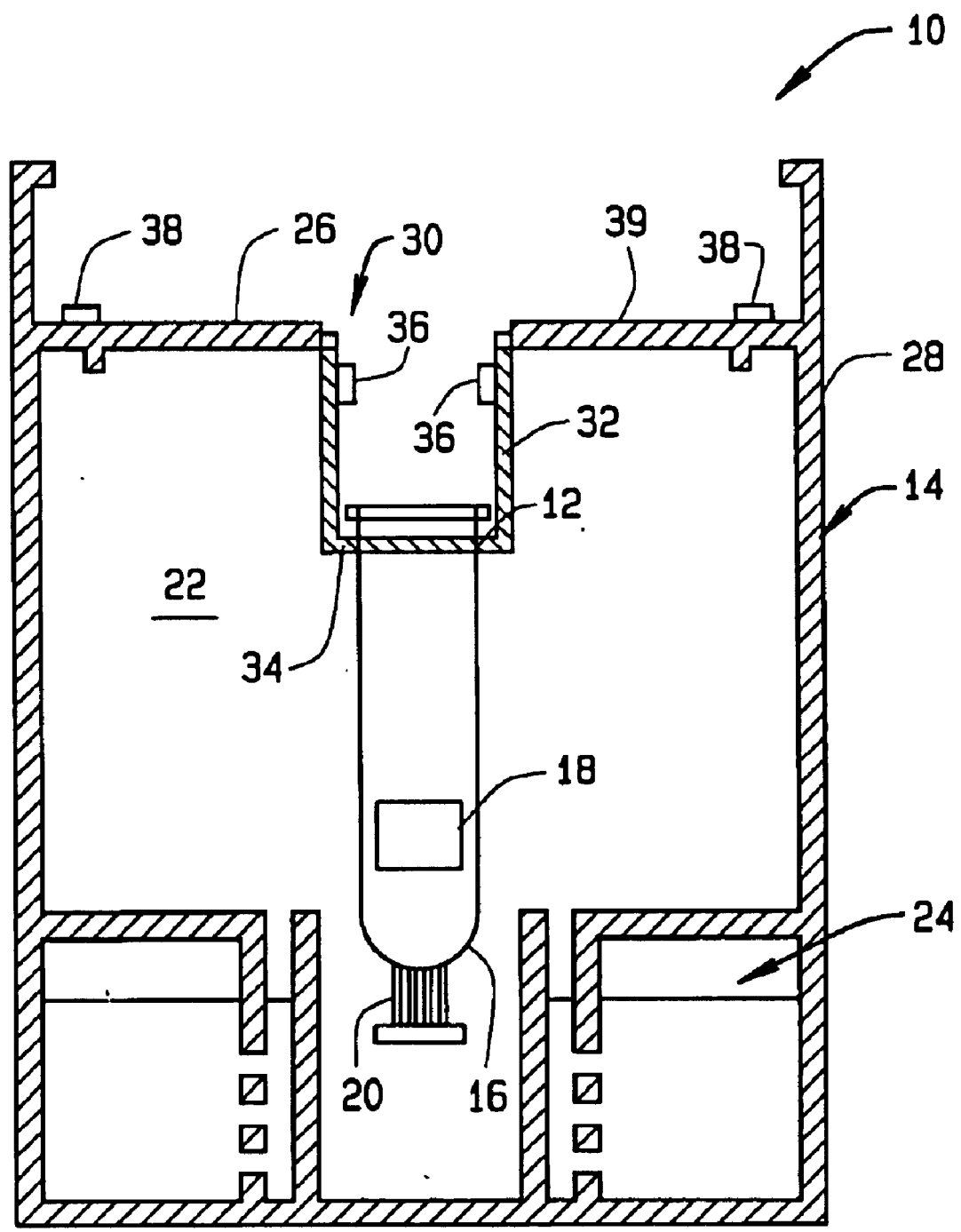
FIG. 1 is simplified schematic illustration of a nuclear reactor.

Referring specifically to the drawings, FIG. 1 is a simplified schematic illustration of a nuclear reactor 10. Reactor 10 includes a reactor pressure vessel 12 positioned in a containment vessel 14. Reactor pressure vessel 12 has a generally cylindrical shape and includes a bottom head 16 and a removable top head (not shown). A reactor core 18 is located inside pressure vessel 12. A plurality of control rod drives 20 extend through bottom head 16 and control the position of the control rods (not shown) in core 18 which adjusts the reactivity of core 18.

Containment 14 includes a drywell 22 in which pressure vessel 12 is located, and a wetwell 24. A refuel floor 26 extends from a side wall 28 of containment 14 and is located above pressure vessel 12. Refuel floor 26 permits worker access to pressure vessel 12 through a vessel access cavity 30 to perform refueling, maintenance, and other servicing functions of pressure vessel 12. Vessel access cavity 30 includes a side wall 32 and a cavity floor 34. Side wall 32 includes at least one ledge 36. Crane rails 38 are located on an upper surface 39 of refuel floor 26.

Figure 2:
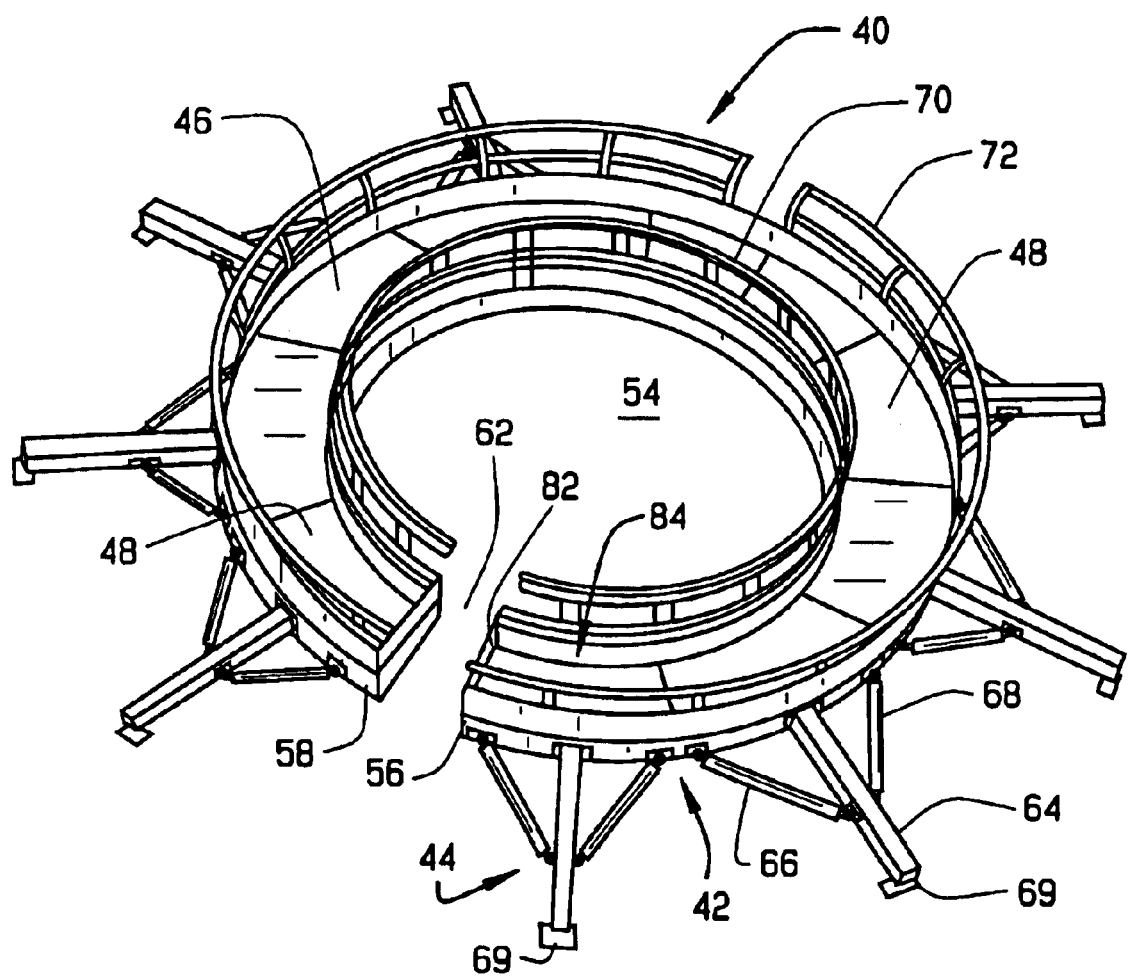
FIG. 2 is a top perspective schematic illustration of a reactor servicing platform in accordance with an embodiment of the present invention.
Figure 3:
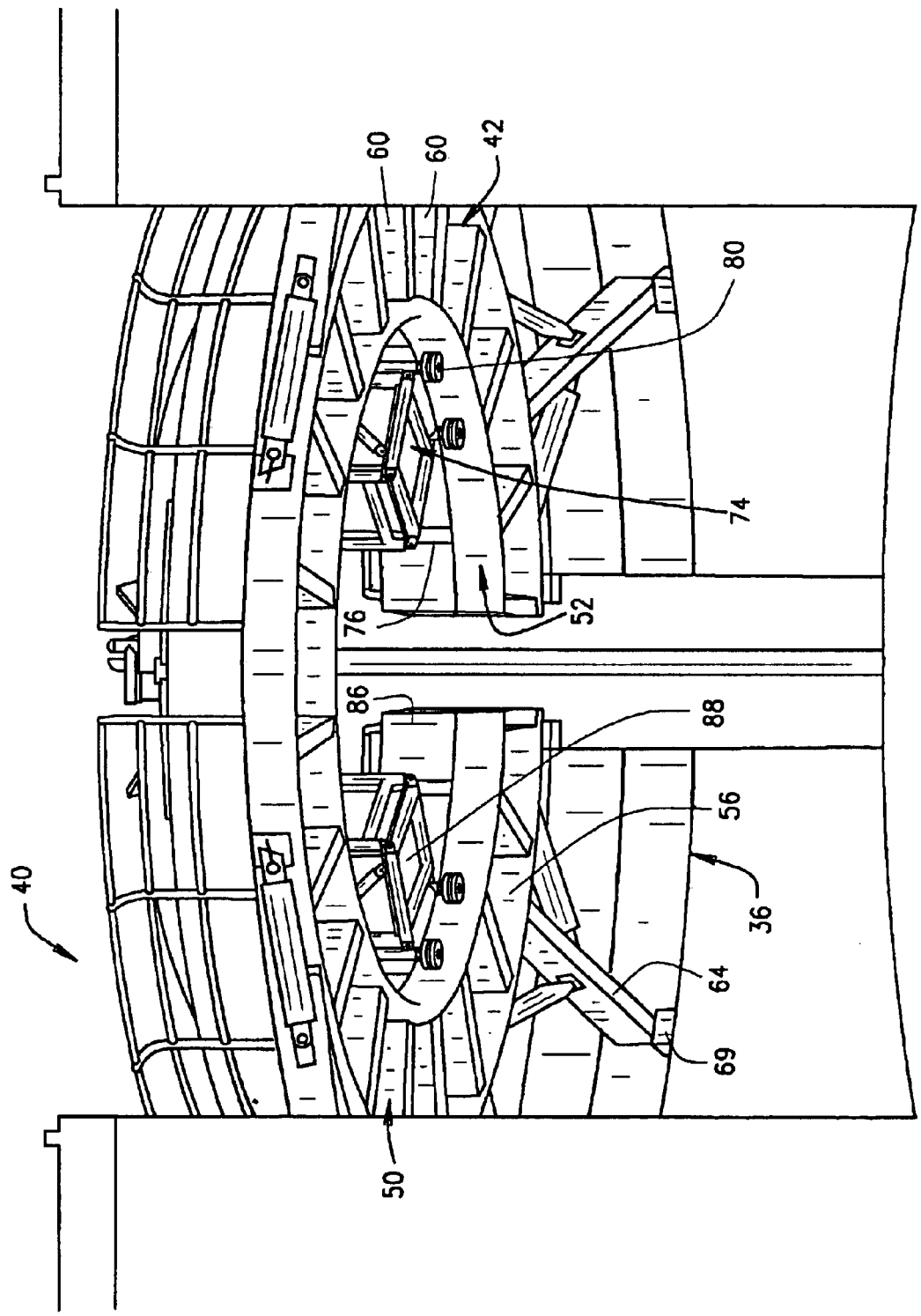
FIG. 3 is a bottom schematic illustration of the reactor servicing platform shown in FIG. 2.

FIG. 2 is a top perspective schematic illustration of a reactor servicing platform 40 in accordance with an exemplary embodiment of the present invention, and FIG. 3 is a bottom perspective schematic illustration of reactor servicing platform 40. Referring to FIGS. 2 and 3, servicing platform 40 includes a frame 42, a support structure 44, and a floor 46 attached to and covering frame 40. Floor 46 is formed from a plurality of floor panels 48 attached to frame 40. Frame 42 is formed from a plurality of interconnecting beams 50. Particularly, frame 42 includes a circularly shaped inner beam 52 which defines a reactor access opening 54 in platform 40, an outer circularly shaped beam 56 which defines an outer perimeter 58 of platform 40, and a plurality of cross beams 60 interconnecting inner and outer beams 52 and 56. A refuel access channel 62 extends from center access opening 54 to outer perimeter 58 of platform 40 forming a substantially C-shaped servicing platform 40.

Support structure 44 includes a plurality of support legs 64 attached to outer beam 56. Support braces 66 and 68 are attached at one end to support leg 64 and attached at an opposite end to outer beam 56. A support foot 69 is attached to each support leg 64 Support legs 64 and support feet 69 are sized to engage ledge 36 of refueling floor access cavity 30 to support platform 40. In an alternate embodiment, support legs and support feet 69 are sized to engage the top of reactor pressure vessel 12 with the top head (not shown) removed. A safety rail or fence 70 extends around a perimeter of access opening 54. Also, a safety rail or fence 72 extends around outer perimeter 58 of platform 40.

Figure 4:
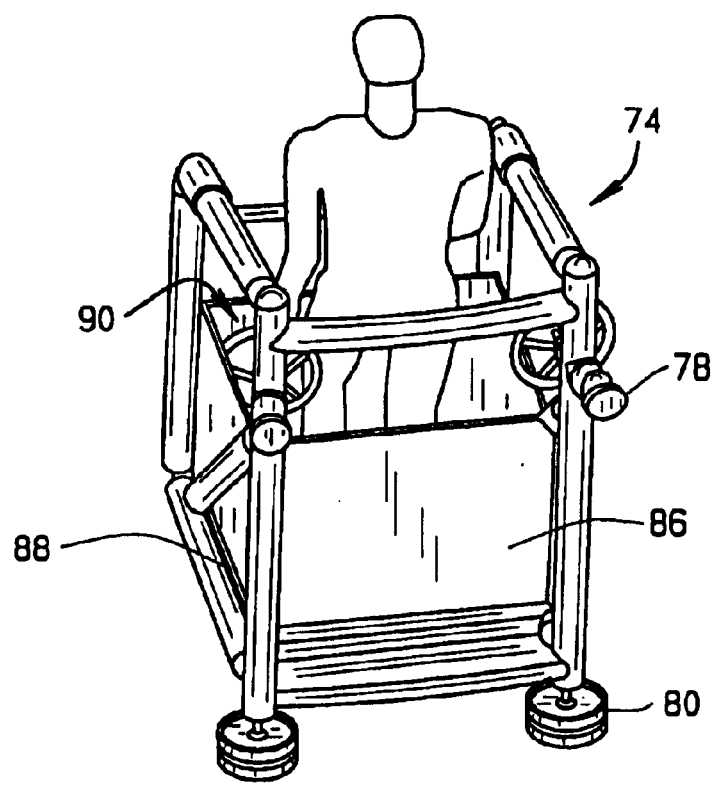
FIG. 4 is a perspective schematic illustration of an auxiliary work platform.

Referring also to FIG. 4, at least one auxiliary platform 74 (two shown in FIG. 3) extends into access opening 54. Each auxiliary platform 74 is movable along a perimeter of access opening 54. Auxiliary platform 74 movably couples to safety rail 70 that is coupled to circular inner beam 52. Safety rail 70 is coupled to inner beam 52 by support brackets 76. Auxiliary platforms 74 include upper rollers 78 that couple to safety rail 70 and lower rollers 80 that movably engage inner beam 52 to permit auxiliary platforms 74 to move along safety rail 72 for positioning within center access opening 54. In alternate embodiments, reactor servicing platform 40 also includes servicing tools, for example, lifting devices, that are coupled to frame 40 and movable along the perimeter of access opening 54.

A wall 82 extends substantially perpendicularly from the periphery of floor 46. Wall 82 and floor 46 together define a C-shaped tray 84. Tray 84 permits platform 40 to be partially submerged in the water covering reactor 10 and provides an area for a worker to utilize platform 40 without getting wet. Also, as shown in FIG. 4, auxiliary platform 74 includes a wall 86 extending substantially perpendicularly from the periphery of a floor 88 of auxiliary platform 74. Wall 86 and floor 88 together define a tray 90. Tray 90 permits auxiliary platform 74 to be partially submerged in the water covering reactor 10 and provides an area for a worker to utilize auxiliary platform 74 without getting wet.

Figure 5:
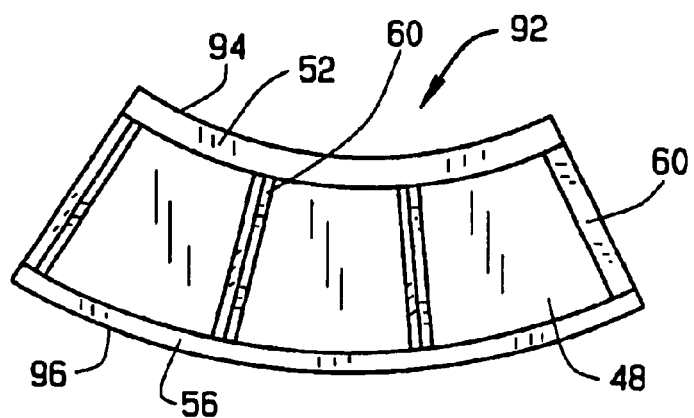
FIG. 5 is a bottom schematic illustration of a modular section of the reactor servicing platform shown in FIG. 2.

Referring also to FIG. 5, reactor servicing platform 40 is formed from a plurality of modular sections 92 coupled together. Each modular section 92 includes a portion 94 of inner beam 52, a portion 96 of outer beam 56, at least one crossbeam 60, and at least one floor panel 48. The modularity of platform 40 facilitates transport to refuel floor 26 by the sizing of modular sections 92 to fit through equipment access openings in primary containment 14. Other platform components, for example, safety rails 70 and 72, support brackets 74, support legs 64, and/or support braces 66 and 68 can be attached to modular section 92 either before or after modular sections 92 are coupled together.

Figure 6:
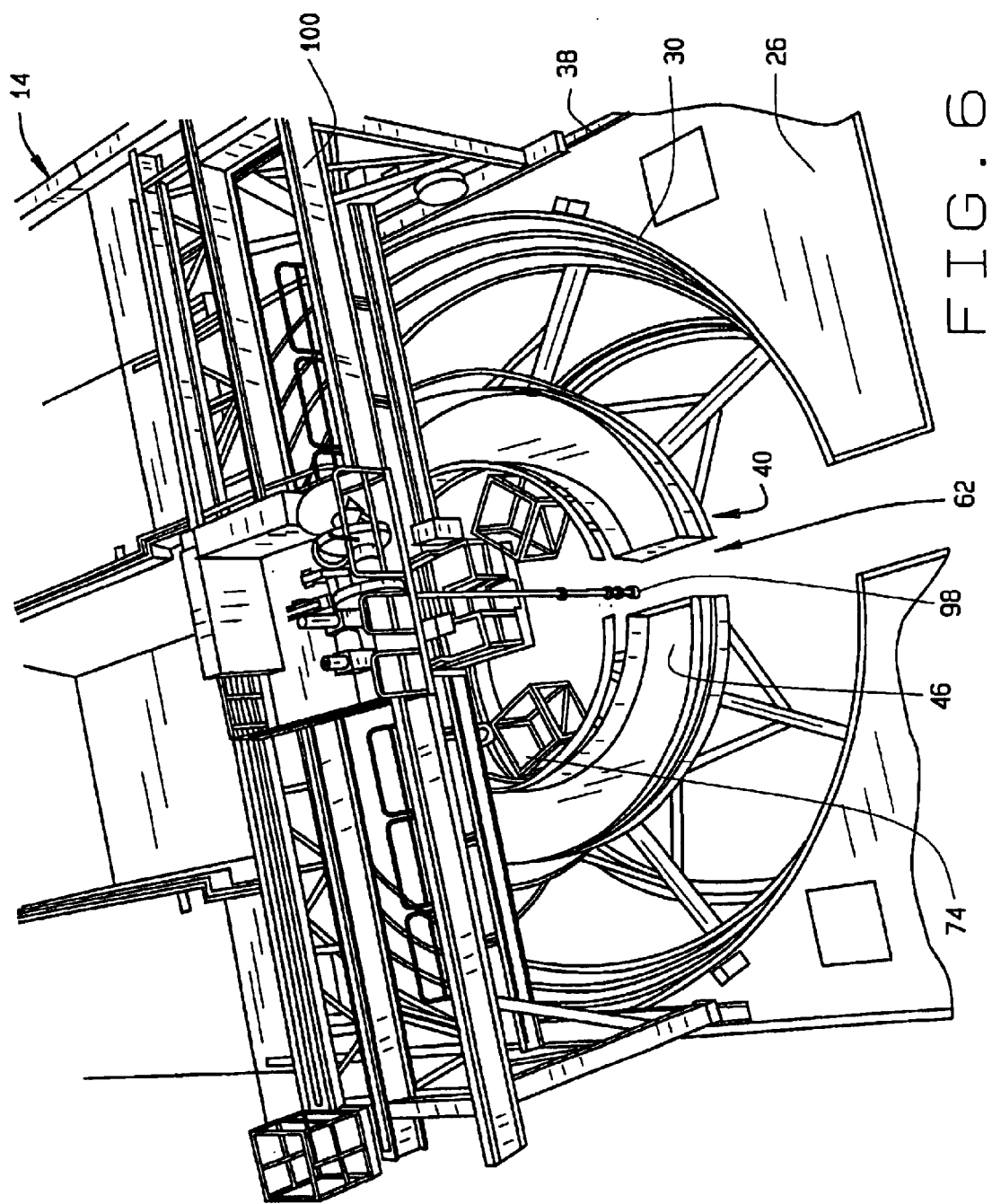
FIG. 6 is a perspective schematic illustration of the reactor servicing platform shown in FIG. 2 installed in a nuclear reactor containment.

FIG. 6 is a top perspective schematic illustration of reactor servicing platform 40 installed in nuclear reactor containment 14. Particularly, platform 40 is positioned in access cavity 30 of refuel floor 26 with support feet 69 resting on ledge 36 in access cavity 30. A refueling tool 98 is attached to an overhead crane 100 that is movably coupled to rails 38 on refuel floor 26. Refueling tool 98 utilizes access channel 62 to perform refueling operations while workers utilize auxiliary platforms 74 and floor 46 of platform 40 to perform maintenance tasks at multiple azimuth locations around pressure vessel 10 (shown in FIG. 1).

Figure 7:
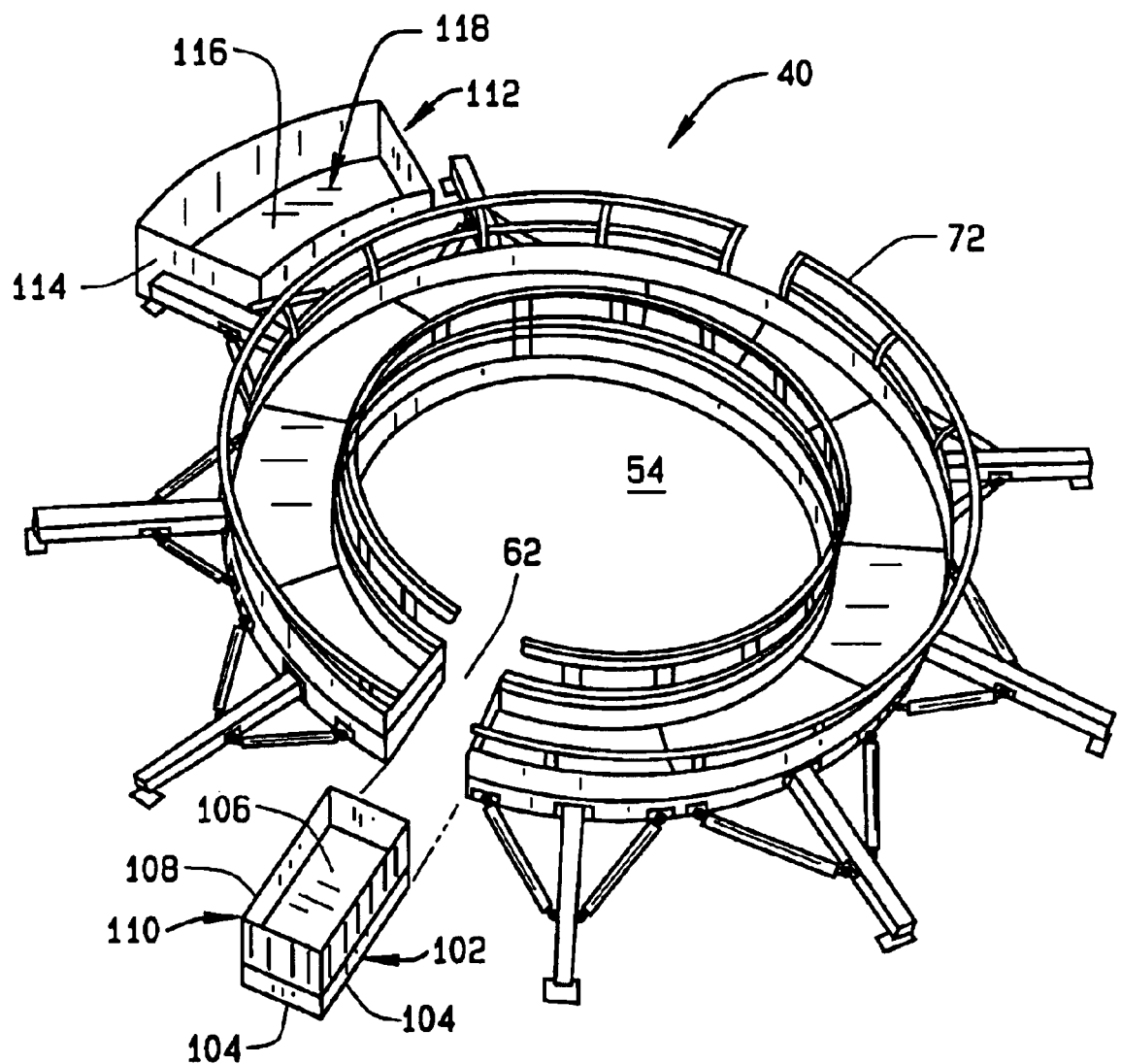
FIG. 7 is a top perspective schematic illustration of the reactor servicing platform shown in FIG. 2 with a bridging platform.

As illustrated in FIG. 7, reactor servicing platform 40 can include a bridging platform 102 that is sized to fit in refuel access channel 62. Bridging platform 102 includes beams 104 and a floor 106 connected to beams 104. Bridging platform 102 includes a wall 108 extending substantially perpendicularly from the periphery of floor 106 of bridging platform 102. Wall 108 and floor 106 together define a tray 110. Tray 110 permits bridging platform 102 to be partially submerged in the water covering reactor 10 and provides an area for a worker to utilize bridging platform 102 without getting wet.

Reactor servicing platform 40 can also include an outer auxiliary platform 112. Outer auxiliary platform 112 is movable along an outer perimeter of reactor servicing platform 40. Auxiliary platform 112 movably couples to safety rail 72 that is coupled to circular outer beam 56. Auxiliary platform 112 includes a wall 114 extending substantially perpendicularly from the periphery of a floor 116 of auxiliary platform 112 . Wall 114 and floor 116 together define a tray 118. Tray 118 permits auxiliary platform 112 to be partially submerged in the water covering reactor 10 and provides an area for a worker to utilize auxiliary platform 112 without getting wet.

Figure 8:
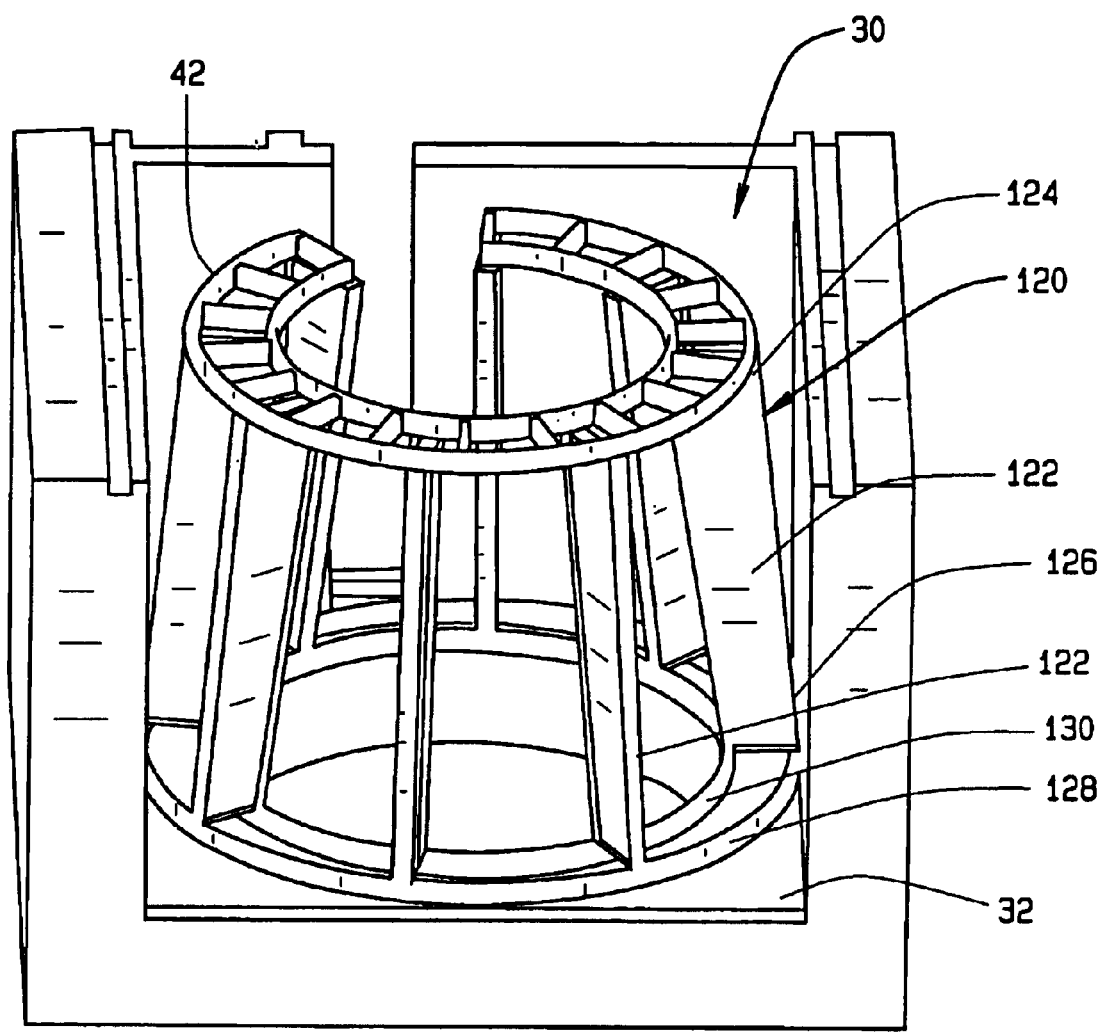
FIG. 8 is a perspective schematic illustration of the support structure of a servicing platform in accordance with an embodiment of the present invention.

FIG. 8 is a perspective schematic illustration of a support structure 120 in accordance with another exemplary embodiment of the present invention. Support structure 120 includes a plurality of legs 122 coupled at a first end 124 to frame 42 and at a second end 126 to circular support beams 128 and 130. Circular support beams 128 and 130 rest on floor 34 of vessel access cavity 30 thereby supporting the reactor servicing platform above the reactor pressure vessel.

While the invention has been described in terms of various specific embodiments, those skilled in the art will recognize that the invention can be practiced with modification within the spirit and scope of the claims.

What is claimed is:

1. A modular reactor servicing platform for a nuclear reactor, the nuclear reactor comprising a reactor pressure vessel positioned in a primary containment, the primary containment comprising a refueling floor having a reactor access cavity having a cavity floor, said modular servicing platform comprising:

a plurality of modular sections coupled together; and
a support structure coupled to said coupled together modular sections;
each said modular section comprising:
a plurality of interconnecting beams; and
at least one floor panel attached to and covering a top of said beams;
said servicing platform further comprising:
a center access opening; and
a refuel access channel extending from said center access opening to an outer edge of said platform forming a substantially C-shaped servicing platform.

2. A reactor servicing platform in accordance with claim 1 wherein said floor panels define a floor of said platform, said platform further comprising a safety rail extending around an outer perimeter of said floor.

3. A reactor servicing platform in accordance with claim 2 further comprising a safety rail extending around an inner perimeter of said floor.

4. A reactor servicing platform in accordance with claim 2 further comprising a wall extending substantially perpendicularly upward from a periphery of said floor, said floor and said wall defining a C-shaped tray.

5. A reactor servicing platform in accordance with claim 1 further comprising at least one auxiliary platform extending into said access opening.

6. A reactor servicing platform in accordance with claim 5 wherein said at least one auxiliary platform is movable along a perimeter of said access opening.

7. A reactor servicing platform in accordance with claim 1 wherein said support structure comprises a plurality of support legs coupled to said frame each support leg comprises a support foot, said support structure configured to support said platform in the access cavity in the refueling floor of the reactor containment.

8. A reactor servicing platform in accordance with claim 1 further comprising at least one auxiliary platform coupled to said frame and extending from an outer perimeter of said reactor servicing platform.

9. A reactor servicing platform in accordance with claim 1 further comprising a bridging platform coupled to said frame and sized to fit in said access channel.

10. A reactor servicing platform in accordance with claim 1 further comprising at least one lifting device coupled to said frame, said at least one lifting device movable along a perimeter of said access opening.

11. A reactor servicing platform for a nuclear reactor, the nuclear reactor comprising a reactor pressure vessel positioned in a primary containment, the primary containment comprising a refueling floor having a reactor access cavity having a ledge and a cavity floor, said servicing platform comprising:

a frame comprising a plurality of interconnecting beams;
a floor comprising at least one floor panel attached to and covering a top of said beams;
a support structure coupled to said frame;
a center access opening in said floor; and
a refuel access channel extending from said center access opening to an outer edge of said platform forming a substantially C-shaped servicing platform.

12. A reactor servicing platform in accordance with claim 11 further comprising a safety rail extending around an outer perimeter of said floor.

13. A reactor servicing platform in accordance with claim 11 further comprising a safety rail extending around an inner perimeter of said floor.

14. A reactor servicing platform in accordance with claim 11 further comprising a wall extending substantially perpendicularly upward from a periphery of said floor, said floor and said wall defining a C-shaped tray.

15. A reactor servicing platform in accordance with claim 11 further comprising at least one auxiliary platform extending into said center access opening.

16. A reactor servicing platform in accordance with claim 15 wherein said at least one auxiliary platform is movable along a perimeter of said center access opening.

17. A reactor servicing platform in accordance with claim 11 wherein said support structure comprises a plurality of support legs, each said support leg comprising a support foot configured to support said platform in the access opening in the refueling floor of the reactor containment.

18. A reactor servicing platform in accordance with claim 11 wherein said support feet are configured to rest on the ledge of the access cavity.

19. A reactor servicing platform in accordance with claim 18 wherein said support feet are configured to rest on the reactor pressure vessel.

20. A reactor servicing platform in accordance with claim 11 wherein said support structure comprises a plurality of support legs configured to support said platform on the floor of the access cavity.

21. A reactor servicing platform in accordance with claim 11 further comprising at least one auxiliary platform coupled to said frame and extending from an outer perimeter of said reactor servicing platform.

22. A reactor servicing platform in accordance with claim 11 further comprising a bridging platform coupled to said frame and sized to fit in said access channel.

23. A reactor servicing platform in accordance with claim 11 further comprising at least one lifting device coupled to said frame, said at least one lifting device movable along a perimeter of said access opening.

* * * * *